E. SALSBURY.
MOTOR VEHICLE.
APPLICATION FILED OCT. 25, 1916.
1,273,412.
Patented July 23, 1918.
3 SHEETS—SHEET 3.
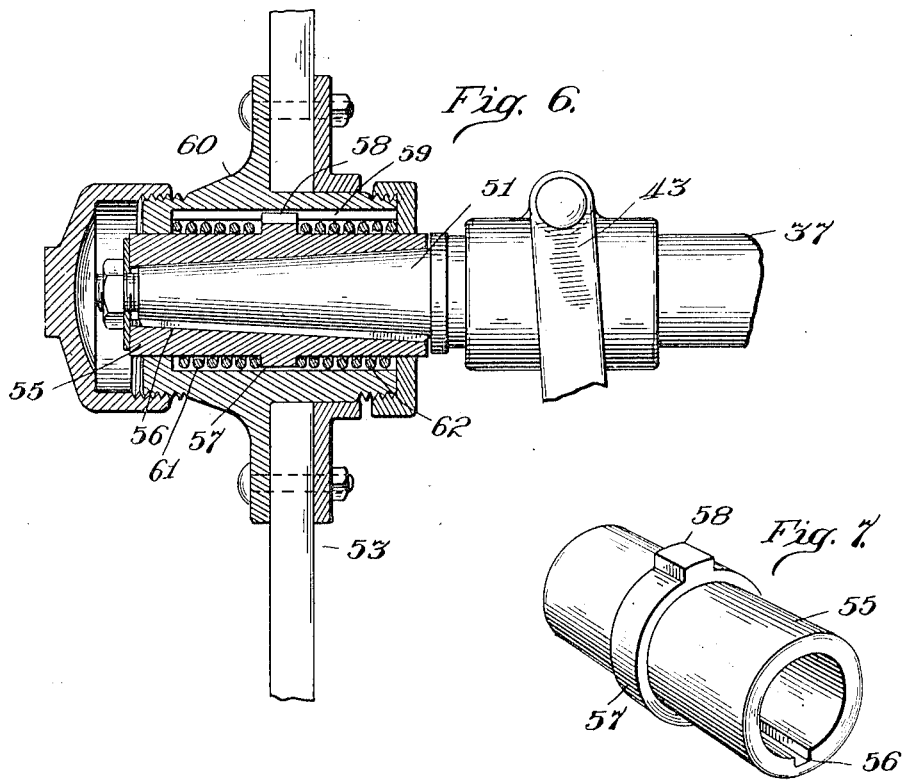
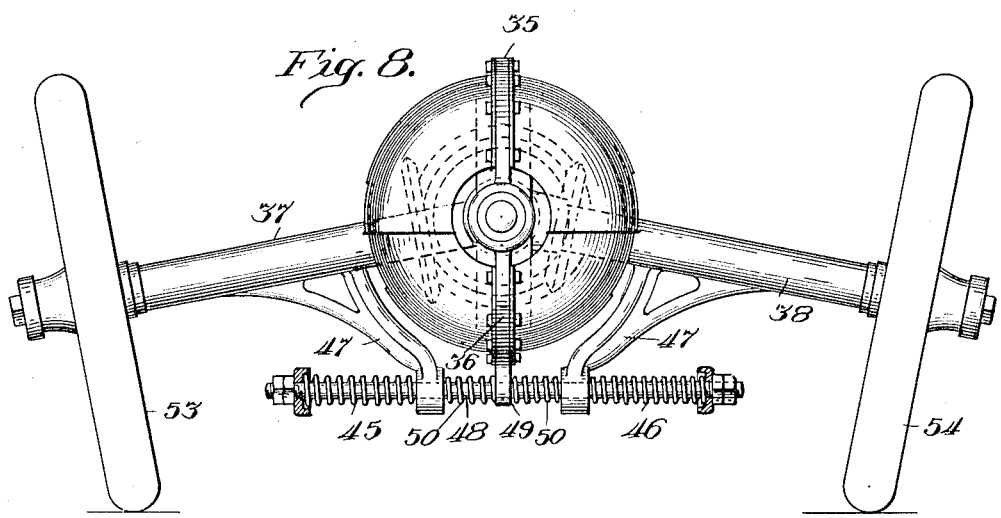
Inventor
Edward Salsbury
By Gillson & Gillson
Attorneys.

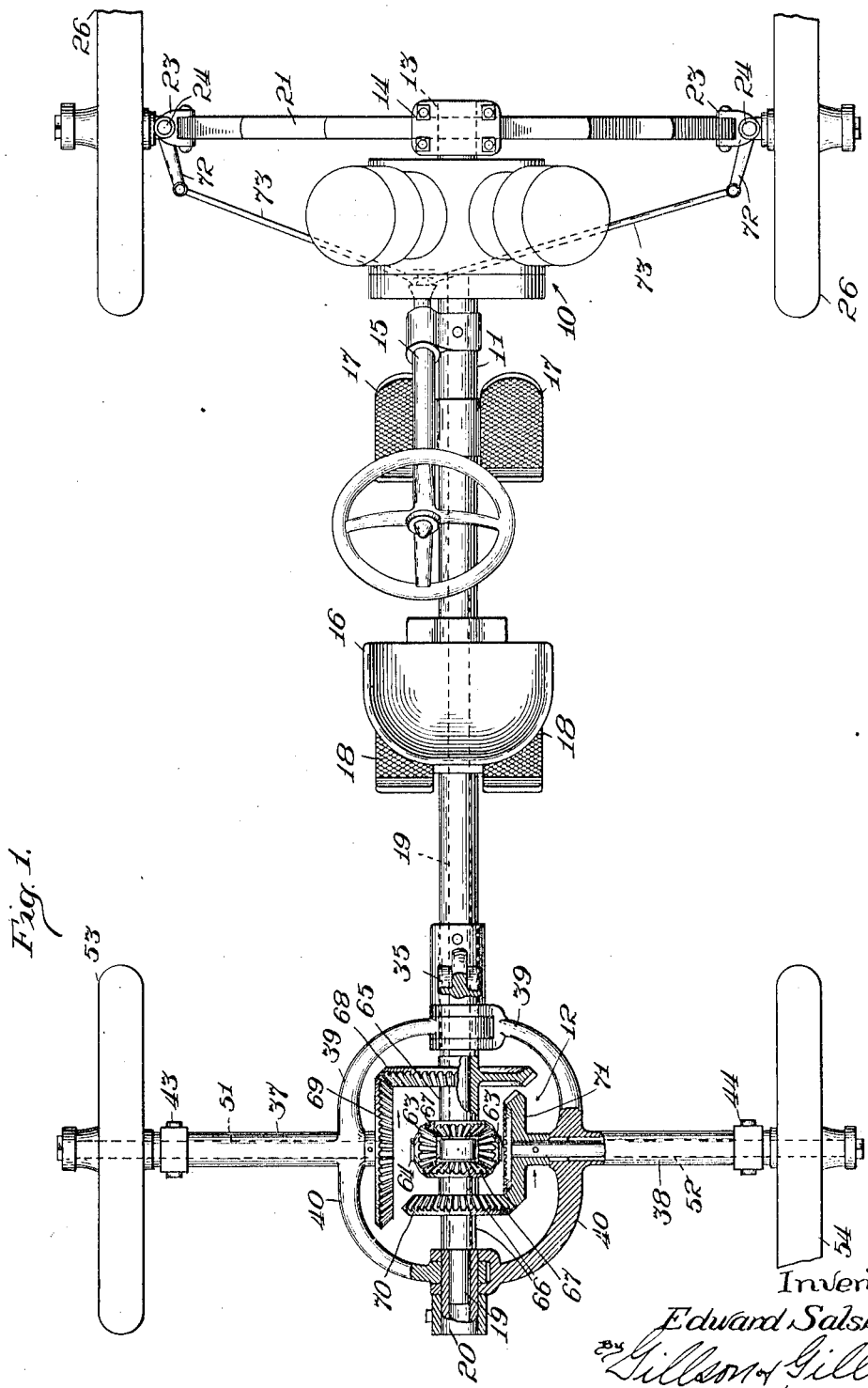

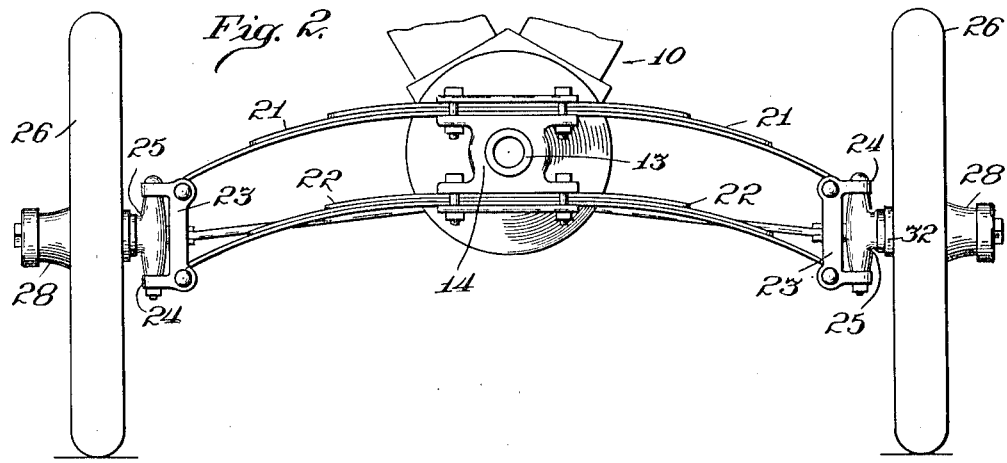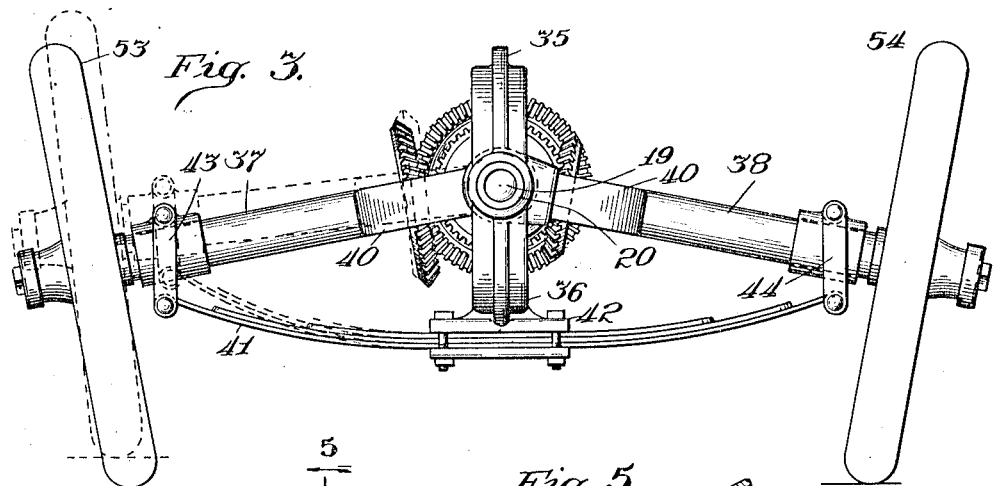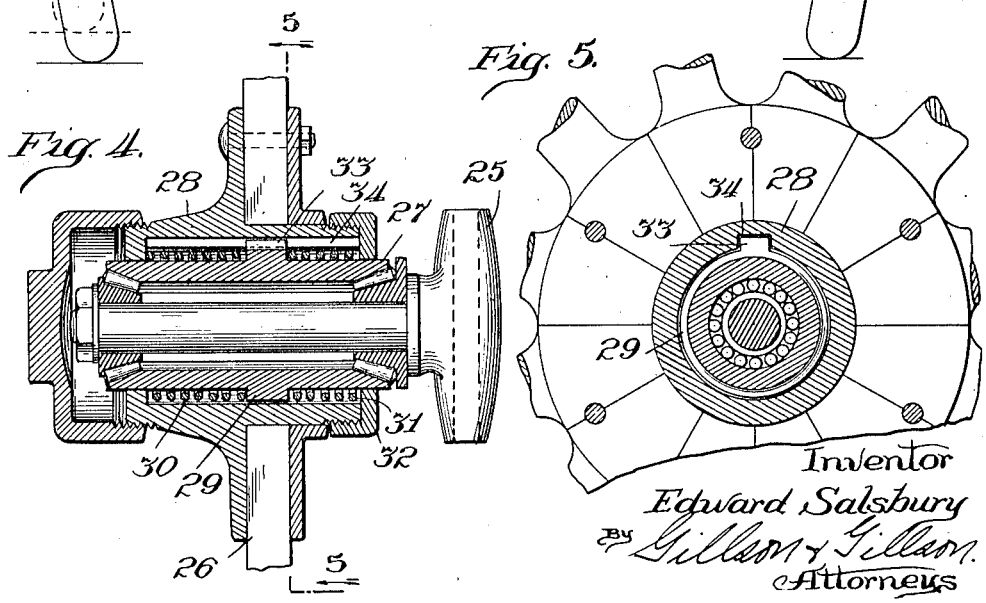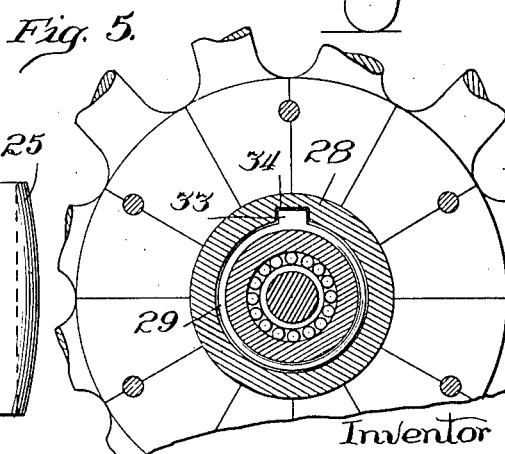

UNITED STATES PATENT OFFICE.

EDWARD SALSBURY, OF CHICAGO, ILLINOIS.

MOTOR-VEHICLE.

1,273,412. Specification of Letters Patent. Patented July 23, 1918.

Application filed October 25, 1916. Serial No. 127,545.

*To all whom it may concern:*

Be it known that I, EDWARD SALSBURY, a citizen of the United States, and resident of Chicago, county of Cook, and State of Illinois, have invented certain new and useful Improvements in Motor-Vehicles, of which the following is a specification, and which are illustrated in the accompanying drawings, forming a part thereof.

The invention relates to motor vehicles and has for its object to provide an improved machine of simple and inexpensive construction, the improvement being especially concerned with increasing the proportion of the spring supported weight of the vehicle. The invention accordingly contemplates a motor vehicle which is made of relatively light weight and a small number of parts by the provision of elastically flexible axles and improved driving connections permitting the use of such axles.

In the accompanying drawings,

Figure 1 is a plan view showing the principal features of construction of one form of the improved motor vehicle, some of the parts being broken away and other parts being shown in section;

Figs. 2 and 3 are respectively a detail front end view and a detail rear end view of the same, some of the parts being shown in a different position by dotted lines in Fig. 3;

Fig. 4 is a detail sectional view taken centrally through one of the non-driven carrying wheels of the vehicle, some of the associated parts of the axle being shown in elevation;

Fig. 5 is a sectional view taken on the line 5—5 of Fig. 4;

Fig. 6 is similar to Fig. 4, but shows the corresponding parts associated with a live or driven wheel;

Fig. 7 is a perspective view showing a form of sleeve which may be used in mounting a driven wheel upon the corresponding axle, and Fig. 8 is similar to Fig. 3, but shows a modified form of construction.

The drawings show the chassis and some of the body parts of a motor vehicle of the type commonly known as cycle car. The motor is conventionally represented at 10. The frame of the machine is principally composed of a rigid tube or sleeve 11 which extends in a straight line from the rear end of the motor case to the differential, generally designated 12. The frame also includes a stud 13 which is rigidly formed with the motor case and extends forwardly therefrom in line with the sleeve or tube 11. The stud 13 preferably has a fixed support in the front spring saddle 14. The sleeve 11 carries the steering column 15, seat 16 and other appurtenances such as foot rests 17 for the occupant of the seat 16 and other foot rests 18 for the occupant of a rear seat (not shown). The propeller shaft 19 is located within the sleeve 11. For simplicity of illustration the transmission is omitted and the propeller shaft 19 is represented as extending in one piece from the motor 10 to a bearing sleeve 20 in rear of the differential 12.

The front axle is illustrated as comprising a pair of parallel leaf springs 21 and 22. These springs may be substantially equal in length to the width of the machine and they are firmly secured against the top and bottom of the spring saddle 14 respectively. The ends of the springs 21 and 22 are connected by a vertical link 23 at each side of the machine. Each link 23 is formed to provide bearing lugs, as 24, for the adjacent swinging stub axle 25.

As the springs 21 and 22 and links 23 form a parallelogram the inclination of the stub axles 25 remains the same at all times. Inasmuch, however, as the distance between the two links 23 varies with the deflection of the springs 21—22, each front wheel, as 26, is preferably mounted for sliding movement on the corresponding stub axle 25. As shown, a sleeve 27 is slidingly extended through the hub, as 28, of each of the wheels 26 and the sleeve 27 is journaled upon the corresponding stub axle 25. The sliding movement of the wheel 26 upon the corresponding sleeve 27 is controlled by forming the sleeve with an outstanding annular rib 29 intermediate its ends and by the provision of springs 30—31 at opposite sides of the said rib. Each of the springs 30 and 31 is coiled about the sleeve 27 and react between the rib 29 and the adjacent end wall of the wheel hub 28. The assembling of the parts is permitted by making one of the end walls of the hub 28 in the form of a removable cap 32. Rotation of each sleeve 27 with the corresponding wheel 26 is insured by providing the rib 29 and the inside wall of the wheel hub 28 with an intercalating stud and groove 33—34.

The frame sleeve 11 and the rear bearing sleeve 20 are rigidly connected as by arches 35 and 36 which extend over and under the differential 12 in a vertical plane. If desired the upper arch, as 35, may serve to support the rear seat (not shown). To permit articulation of the rear axle, the axle housing is formed in two parts, as 37 and 38 and each of these parts of the axle housing is mounted to swing in a vertical plane. As shown, each of the parts 37—38 of the axle housing is formed at its inner end to provide a pair of bracket arms 39 and 40. These bracket arms extend about the differential 12 and are journaled respectively upon a rear end of the frame sleeve 11 and the forward end of the bearing sleeve 20.

In the form of construction more particularly illustrated in Fig. 3 a leaf spring 41 is employed for resisting the articulation of the rear axle. To this end the arch 36 is formed to provide a downwardly facing spring saddle 42 and the spring 41 is firmly secured against this saddle. In this instance spring shackles, as 43 and 44, are employed for connecting the ends of the spring 41 with the two parts 37—38 of the axle housing. In the form of construction illustrated in Fig. 8 a pair of coiled springs 45 and 46 are employed for resisting the articulation of the rear axle. The use of springs of this form is permitted by providing a depending bracket arm 47 upon each of the parts 37 and 38 of the axle housing. The bracket arms 47 are each apertured at their lower ends to receive a transverse spring bolt 48 and the springs 45 and 46 are each mounted upon the spring bolt 48 beyond the corresponding bracket arm 47. To prevent tilting of the sleeve 11 and other parts of the frame, the arch 36 is provided with a depending lug 49 which is also apertured to receive the spring bolt 48 and buffer springs, as 50, are mounted on the spring bolt between the depending lug 49 and the two bracket arms 47.

Preferably the rear springs, as 41, or 45 and 46 will be so adjusted that the rear axle normally assumes the cambered shape illustrated in Figs. 3 and 8. It will, of course, be understood that the two parts as 51—52 of the rear axle extend through the corresponding parts 37—38 of the axle housing and that each of the rear wheels as 53—54 is fixed against rotation upon the outer end of the adjacent axle part 51—52. The construction in this respect may be of a well-known form except that provision is desirably made for permitting a limited sliding movement of each axle part 51—52 in the corresponding wheel 53—54. As shown, a sleeve 55 is mounted upon the outer end of each of the axle parts 51—52 and is fixed against rotation thereon as by means of a key and key-way 56. The construction of each sleeve 55 is in other respects like that of the sleeves 27 associated with the front wheels 26. That is to say, each sleeve 55 is formed with an outstanding annular rib 57 intermediate its ends and this rib is provided at one side with a projecting lug 58 which slidingly enters a groove or key-way 59, in the hub 60 of the corresponding wheel, as 53. Springs 61 and 62 are coiled about the sleeve 55 at opposite sides of the rib 57 to react between the rib and the adjacent end wall of the hub 60.

The differential 12 is constructed to permit the articulation of the rear axle without interfering with the transmission of power to each of the rear wheels 53—54 through the corresponding axle part 51—52. As shown, a pair of beveled planetary gears 63 are rotatably mounted upon studs 64 and these studs are fixed in the propeller shaft 19 to project laterally from said shaft in opposite directions. The planetary gears 63 accordingly travel about the axis of the propeller shaft during the rotation of said shaft. These planetary gears serve for transmitting power to the axle parts 51 and 52. For this purpose two sleeves 65 and 66 are rotatably mounted upon the propeller shaft 19 in front and in rear of the planetary gears 63. A beveled gear 67 mounted upon the inner end of each of the sleeves 65—66 meshes with both of the planetary gears 63. A second beveled gear 68 is mounted on the sleeve 65 and meshes with a gear 69 on the inner end of the axle part 51. Similarly a second beveled gear 70, mounted on the sleeve 66, meshes with a gear 71 on the inner end of the axle part 52. While the arrangement does not permit of the gears 68 and 70 being of the same size, the two rear wheels 53—54 are normally driven at the same speed by making the two gears 70—71 of the same relative size with the two gears 68 and 69. As shown, the gear 69 comprises the same number of teeth as the gear 68 and the gear 71 comprises the same number of teeth as the gear 70.

The front wheels 26 may be turned for steering in any convenient manner, but preferably by mechanism which will not interfere with the parallel relation of the two wheels during the flexing of the springs 21—22. As shown, a crank arm 72 is applied to the inner end of each of the stub axles 25. The mechanism for swinging these crank arms is conventionally represented as comprising a pair of links 73 which extend to the lower end of the steering column 15.

The construction provides that all of the weight of the vehicle except that of the wheels is elastically supported and there is a rigid direct connection between the front and rear axles on the center line of the vehicle. Furthermore the propeller shaft is made without joints and the entire chassis comprises only a small number of parts. While the length of the axles may be varied by their articulation the width of the tread is permitted to remain constant by the sliding engagement of the wheels with the axles.

I claim as my invention:

1. In a motor vehicle, in combination, flexible front and rear axles, a rigid frame comprising a cylindrical tube extending in a straight line between the axles and having its opposite ends connected with the two axles at their mid-length, a motor mounted on the said frame, and driving connection between the motor and the parts of one of the axles at each side of the frame.

2. In a motor vehicle, in combination, a propeller shaft, a sleeve inclosing the propeller shaft and constituting a frame for the vehicle, a pair of tubular arms hingedly connected to the said sleeve and extending laterally therefrom in opposite directions but in a common plane, an axle section extending through the bore of each arm, and gear connection between the propeller shaft and each of the said axle sections.

3. In a motor vehicle, in combination, a frame, a propeller shaft extending longitudinally through the frame at its mid-width, a pair of brackets each hingedly connected to the frame to swing in a vertical plane about the center line of the propeller shaft as an axis, a pair of axle sections extending laterally outward from the propeller shaft in opposite directions but in a common plane, each of the axle sections being journaled in one of the said brackets to swing with the bracket, a planetary gear mounted upon the propeller shaft and turning about the said shaft by its rotation, a pair of sleeves rotatably inclosing the propeller shaft, one at each side of the planetary gear, a pair of gears mounted on each sleeve, one of the gears mounted on each sleeve meshing with the planetary gear and a gear on each axle section meshing with the other gear on one of the sleeves.

4. In a motor vehicle, in combination, a frame, a propeller shaft extending centrally through the frame, a pair of axle sections extending laterally outward from the propeller shaft in opposite directions but in a common plane, each axle section being movably connected with the frame to swing in a vertical plane about the center line of the propeller shaft as an axis, a spring resisting the said swinging movement of the axle sections, gear connection between the propeller shaft and each of the said axle sections, a carrying wheel mounted for axial sliding movement upon each of the axle sections, but to rotate with the axle section and springs resisting the said sliding movement of the wheels upon the axle sections.

5. In a vehicle, in combination, a frame, an elastically flexible axle for the frame, carrying wheels at each end of the axle, one of the said carrying wheels being slidingly connected with the axle for movement thereon in the direction of the axis of the wheel, and springs resisting the said sliding movement of the last mentioned wheel in both directions.

6. In a vehicle, in combination, a frame, an articular axle for the frame, a spring resisting articulation of the axle, carrying wheels mounted upon the ends of the axle, one of the said carrying wheels being slidingly connected with the axle for movement thereon in the direction of the axis of the wheel, and springs resisting the said sliding movement of the last mentioned wheel in both directions.

7. In a vehicle, in combination, a frame, a pair of carrying wheels, a driving shaft on the frame, an axle for each of said wheels, both axle and wheel being movable together angularly in a vertical plane about the axis of the driving shaft as a pivot, and differential gearing between the shaft and the axles.

8. In a vehicle, in combination, a frame, a pair of carrying wheels, a driving shaft on the frame, an axle for each of said wheels, both axle and wheel being movable together angularly in a vertical plane about the axis of the driving shaft as a pivot, and gearing between the shaft and the axles.

9. In a vehicle, in combination, a frame, a pair of carrying wheels, an axle for each of said wheels, a driving shaft, a differential having its planetary gears mounted directly on laterally projecting arms on the said driving shaft, the gears meshing with the planetary gears being rotatably mounted on sleeves on said shaft, and a bevel gear on each sleeve in mesh with a bevel gear on each axle thereby allowing each axle to move angularly in a vertical plane with the axis of the driving shaft as a pivot.

10. In a vehicle, in combination, a frame, a pair of carrying wheels, an axle for each of said wheels, spring connections between the frame and said axles constructed so that vertical movement of the wheels varies the distance between the outer ends of the axles, said wheels being slidingly connected with their axles for movement thereon in the direction of the axis of the wheel to allow the distance between the wheels to remain substantially constant, and springs resisting the sliding movement of the wheels in both directions.

11. In a motor vehicle, in combination, a rigid frame, a motor carried thereby, a longitudinal propeller shaft fixed in position throughout its length centrally in the frame, a pair of axle sections one at each side of the frame and each having elastic angular movement about the axis of the propeller shaft, driving connection between the propeller shaft and both axle sections and a carrying wheel mounted upon each axle section.

12. In a vehicle, in combination, a frame, a pair of carrying wheels, an axle for each of said wheels movable angularly in a vertical plane about a common axis adjacent the center of the vehicle, and a leaf spring connected at its mid point to the frame adjacent the center of the vehicle and at its ends to the ends of the said axles.

13. In a motor vehicle, in combination, a rigid frame, a motor carried thereby, a longitudinal propeller shaft fixed in position throughout its length centrally in the frame, a pair of axle sections one at each side of the frame and each having elastic angular movement about the axis of the propeller shaft, differential driving connection between the propeller shaft and the two axle sections and a carrying wheel mounted upon each axle section.

EDWARD SALSBURY.